(12) United States Patent
Lull et al.

(10) Patent No.: US 10,987,836 B2
(45) Date of Patent: Apr. 27, 2021

(54) HOLLOW PROFILE MEMBER SUCH AS A TUBE MADE OF THERMOSETTING COMPOSITE MATERIALS AND CORRESPONDING METHOD

(71) Applicants: EPSILON COMPOSITE, Gaillan en Médoc (FR); SOMOCAP, Ustaritz (FR)

(72) Inventors: Stéphane Lull, Hourtin (FR); Ambroise Latron, Hourtin (FR); Fabrice Sorhouet, Briscous les Salines (FR); Jérôme Nadeau, Cambo les Bains (FR); Thomas Clerc, Bayonne (FR)

(73) Assignees: EPSILON COMPOSITE, Gaillan en Médoc (FR); SOMOCAP, Ustaritz (FR)

( * ) Notice: Subject to any disclaimer, the term of this patent is extended or adjusted under 35 U.S.C. 154(b) by 620 days.

(21) Appl. No.: 15/579,182

(22) PCT Filed: Apr. 19, 2016

(86) PCT No.: PCT/EP2016/058674
§ 371 (c)(1),
(2) Date: Dec. 1, 2017

(87) PCT Pub. No.: WO2016/192888
PCT Pub. Date: Dec. 8, 2016

(65) Prior Publication Data
US 2018/0126613 A1    May 10, 2018

(30) Foreign Application Priority Data

Jun. 1, 2015 (FR) .......................................... 1554954
Jun. 26, 2015 (FR) .......................................... 1555979

(51) Int. Cl.
*B29C 45/14* (2006.01)
*F16C 3/02* (2006.01)

(52) U.S. Cl.
CPC .. *B29C 45/14614* (2013.01); *B29C 45/14311* (2013.01); *F16C 3/023* (2013.01)

(58) Field of Classification Search
CPC ......... B29C 45/14311; B29C 45/14614; B29C 45/14631; B29C 2045/14327;
(Continued)

(56) References Cited

U.S. PATENT DOCUMENTS 4,185,472 A * 1/1980 Yates ...................... F16C 3/026
464/181
4,664,644 A * 5/1987 Kumata .................. F16C 3/026
464/181
(Continued)

FOREIGN PATENT DOCUMENTS

CN    2608647 Y    3/2004
CN    2634070 Y    8/2004
(Continued)

OTHER PUBLICATIONS

English translation of Office Action dated Jan. 24, 2020 to Japanese Patent Application No. 2017-563124.
(Continued)

*Primary Examiner* — Josh Skroupa
(74) *Attorney, Agent, or Firm* — Kenealy Vaidya LLP

(57) ABSTRACT

A method for overmolding a thermoplastic tip onto a hollow profile member made of thermosetting composite and to an assembly including a thermosetting profile member and a thermoplastic tip, wherein it includes machining the shape of the profile member made of thermosetting composite on the injection region; positioning a cap in the profile member; thermally conditioning the profile assembly and the cap; and
(Continued)

injecting the tip with thermoplastic composite in order to create the junction of the profile member, the cap and the tip.

20 Claims, 3 Drawing Sheets

(58) Field of Classification Search
CPC ...... F16B 7/0406; F16B 7/0413; F16C 3/023; F16C 3/026; F16D 1/027; F16D 1/068; F16L 47/02; Y10T 403/47; Y10T 403/473
USPC .................. 403/265, 268; 464/181, 182, 183
See application file for complete search history.

(56) References Cited

U.S. PATENT DOCUMENTS

| | | | | |
|---|---|---|---|---|
| 4,704,918 A | * | 11/1987 | Orkin | F16C 3/026 |
| | | | | 464/181 |
| 5,613,794 A | * | 3/1997 | Isaac | B29C 66/1222 |
| | | | | 403/265 |
| 9,303,682 B2 | * | 4/2016 | Sohl | F16C 3/023 |
| 9,702,391 B2 | * | 7/2017 | Erlacher | B62D 27/026 |
| 10,138,925 B2 | * | 11/2018 | Nakamura | F16D 1/068 |
| 2014/0016995 A1 | * | 1/2014 | Wilson | F16C 3/026 |
| | | | | 464/181 |

FOREIGN PATENT DOCUMENTS

| | | | | |
|---|---|---|---|---|
| CN | 102774038 A | | 11/2012 | |
| DE | 102012018804 A1 | | 3/2014 | |
| DE | 102012223674 A1 | * | 3/2014 | ............. F16C 3/026 |
| DE | 102012021493 A1 | | 4/2014 | |
| JP | S58-113619 A | | 7/1983 | |

OTHER PUBLICATIONS

English translation of Search Report dated Jan. 23, 2020 to Japanese Patent Application No. 2017-563124.
English translation of Office Action issued to Chinese Patent Application No. 201680041096.3.
International Search Report for PCT Patent App. No. PCT/EP2016/058674 (dated Jun. 28, 2016) with English language translation thereof.
Written Opinion for PCT Patent App. No. PCT/EP2016/058674 (dated Jun. 28, 2016).

* cited by examiner

HOLLOW PROFILE MEMBER SUCH AS A TUBE MADE OF THERMOSETTING COMPOSITE MATERIALS AND CORRESPONDING METHOD

CROSS REFERENCE TO RELATED APPLICATION(S)

This application is a national phase filing under 35 C.F.R. § 371 of and claims priority to PCT Patent Application No. PCT/EP2016/058674, filed on Apr. 19, 2016, which claims the priority benefit under 35 U.S.C. § 119 of French Patent Application No. 1555979, filed on Jun. 26, 2015, and French Patent Application No. 1554954, filed on Jun. 1, 2015, the contents of each of which are hereby incorporated in their entireties by reference.

BACKGROUND

Some embodiments relate to a hollow profile member such as a tube produced from thermosetting composite materials possibly including or consisting of carbon fibers, over which is overmolded an end-fitting produced from thermoplastic materials or from thermoplastic composite material to produce a piece such as a connecting rod, and in this case the two ends will be overmolded.

This type of piece is subject to significant forces both in terms of traction and compression, but also in terms of torsional vibration and temperature, particularly in the case of the connecting rods used for the industrial and aeronautical sectors. It is therefore desired in this embodiment for the link between the profile member and the overmolded end-fitting to be sufficiently strong. The traction force that it must or should withstand is greater than 1 tonne with a temperature gradient up to 140° for a profile member section with a maximum diameter or width of 15 mm. The two materials (thermosetting carbon and thermoplastic plug and end-fitting) have different expansion coefficients and the temperature differences induce risks of separation of the two materials and therefore a risk of accident.

A method is known for chemically welding two thermoplastic pieces as described in the patent DE 10 2012 021 493, in which the thermoplastic pieces are heated up and pressed together so as to create a chemical weld zone between the two pieces, even to hot-reshape the pieces in order to produce a relief that makes it possible to increase the strength of the two pieces together. However, this method is not applicable to a thermosetting tube which cannot be reshaped and cannot be mixed with a thermoplastic to produce a chemical weld.

SUMMARY

Some embodiments propose an assembly and a method for manufacturing the assembly which make it possible to address these issues.

The method for overmolding a thermoplastic end-fitting on a hollow profile member made of thermosetting composite according to some embodiments is characterized in that it has the following steps:
  machining the shape of the profile member made of thermosetting composite on the injection zone,
  positioning the plug in the profile member,
  thermally conditioning the assembly of the profile member and of the plug,
  injecting the end-fitting with thermoplastic composite to create the junction of the profile member, the plug and the end-fitting.

This method is simple because it may require few steps but it makes it possible to obtain assemblies that can withstand strong traction, compression, temperature gradients, and with materials of different expansion coefficients. The plug will possibly have a length greater than or equal to the length of the injection zone in order to withstand the injection pressure exerted on the walls of the profile member. The profile member will be able to be made of thermosetting carbon, pultruded or not. It will for example be able to be produced according to a pultrusion method as described in the patent EP 1 774 216. The machining is performed on the outside of the profile member but a second machining on the inside may also be envisaged. The shape of the end-fitting will be adapted to allow a coupling with the peripheral connecting rod structures. The machining of the shape of the profile member will allow the mechanical linking of the profile member and the end-fitting, and indeed, since the thermosetting profile member cannot be deformed unlike a thermoplastic, it is the machined shapes on the profile member which will make it possible to hold the end-fitting.

Advantageously, the method includes a step of chemical treatment of the profile member in the injection zone. This chemical treatment after the machining of the profile member in the machined part of the profile member can include or can consist of the use of a solvent, an adhesive or a wetting agent. This treatment will improve the link between the profile member and the end-fitting.

Optionally, the method includes a step of laser treatment of the profile member in the injection zone.

According to a first variant, the positioning of the plug is done directly on the profile member. The plug is placed in the profile member before its placement in the injection tool. In this case, the plug will possibly have a peripheral flange.

According to a second variant, the positioning of the plug is done by positioning it in an injection tool, then by installing the profile member in the injection tool. In this case, the plug will be able to be hollow and threaded to be held in the tool, and it will then be sufficient to insert the profile member around the plug.

The plug will for example be able to be made of polymer material such as a thermoplastic, made of metal material such as aluminum or titanium and a combination of both.

Some embodiments also relate to an assembly including a hollow profile member made of thermosetting composite of internal diameter $D_1$ and of external diameter $D_2$ and a thermoplastic end-fitting, it is characterized in that it includes a plug arranged inside the profile member and that the profile member includes a machined part at an end of the profile member. The assembly will in particular be able to be a connecting rod produced from a hollow profile member which can be of tubular shape (with a circular, square, rectangular, triangular profile, of flared form or not, etc.) and on which a thermoplastic end-fitting, composite or not, is overmolded. The plug is placed in the profile member on the overmolded side in order to prevent the profile member from being filled. The plug has at least a part of its external profile complementing the internal profile of the profile member and of substantially identical size in order to plug it. The plug has a length greater than or equal to the length of the overmolded part of the overmolded profile member and of the end-fitting. It thus has a dual function of closing the profile member and of absorbing the radial forces exerted during the injection on the walls of the profile member. The profile member therefore remains largely empty, which makes it possible to obtain a piece of low weight, of reduced costs because there is less material. The profile member will be able to be produced in thermosetting carbon and be obtained by pultrusion.

According to some embodiments, the machined part of the profile member is pierced. These holes will allow the thermoplastic material to enter into the profile member as far as to reach the plug, which improves the strength of the assembly. In this case, an internal machining of the profile member is advantageous because the contact surface of the thermoplastic material with the profile member is then greater.

According to a second embodiment, the machined part of the profile member has circular furrows or grooves, helical or not. These furrows will be able to have different profiles: V-shaped, square, pentagonal, rounded, etc. It is also possible to provide a single void.

According to a third embodiment, the machined part of the profile member has received a laser treatment. The laser treatment makes it possible to produce striations of very small dimensions.

It may be possible to provide an additional chemical link on the machined part of the profile member.

According to a particular embodiment, the plug has an external diameter $d_1$ smaller than the internal diameter $D_1$ of the profile member over a portion of its length. This leaves a space between the profile member and the plug where the thermoplastic material will be able to enter if the profile member is perforated or, where the profile member will be able to undergo a slight deformation during the injection of the thermoplastic material.

According to another embodiment, the plug has a peripheral edge of diameter $d_2$ greater than the external diameter $D_2$ of the profile member. This allows it to hold onto the edge of the profile member and avoid being pressed into the profile member during the thermoplastic injection.

The plug can have parts of dimensions less than those of the interior of the profile member and in this case it will be held during injection in the injection tool itself.

BRIEF DESCRIPTION OF THE DRAWINGS

Other features will also emerge to the person of ordinary skill in the art on reading the examples hereinbelow, illustrated by the attached figures, given by way of example.

DETAILED DESCRIPTION OF EXEMPLARY EMBODIMENTS

Figures 1, 2, 3:
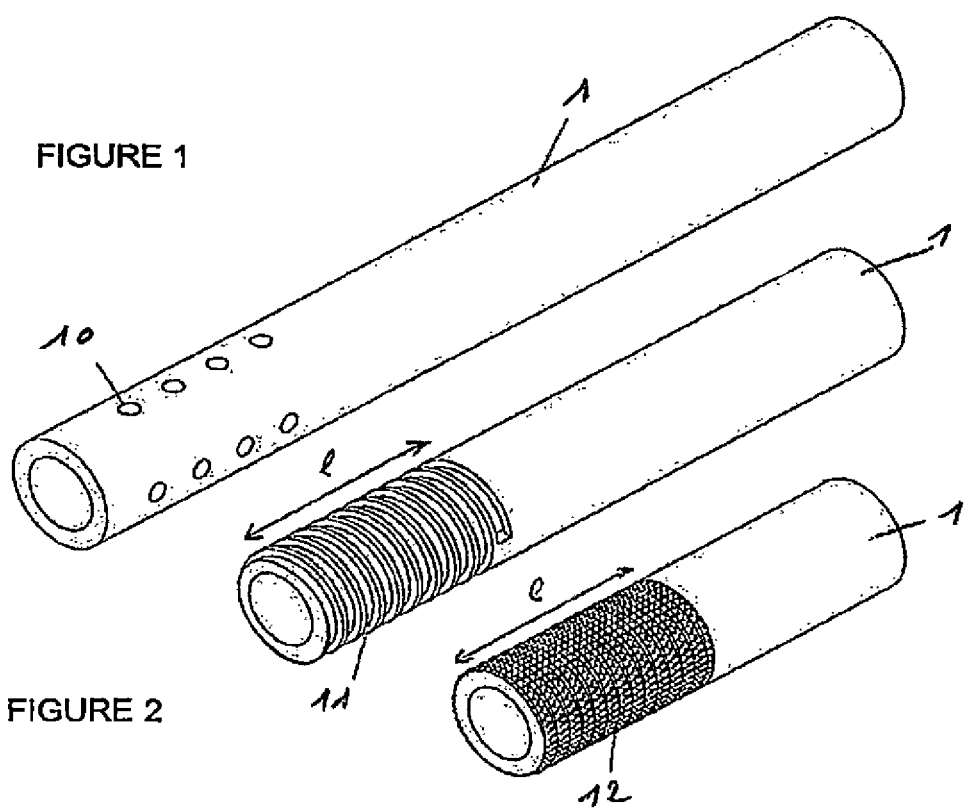
FIG. 1 is a first example of a profile member according to some embodiments.
FIG. 2 represents a second example of a profile member according to some embodiments.
FIG. 3 is a third example of a profile member according to some embodiments.

The profile member 1 illustrated in FIG. 1 is a hollow tube made of thermosetting composite material, for example thermosetting carbon, produced or not by pultrusion, with an end machined with holes 10. These holes 10 will allow the passage of the thermoplastic material into the profile member 1.

In FIG. 2, the profile member 1 has an end with furrows 11. The length 1 of the part with furrows will possibly have substantially the same length as the thermoplastic material injection zone 13.

In FIG. 3, the profile member 1 has an end with asperities 12, and they will be able to be produced by machining or by laser. The area of the asperities will possibly be substantially of the same length 1 as the thermoplastic material injection zone 13. Other forms of surfaces are also possible.

Figures 4, 5:
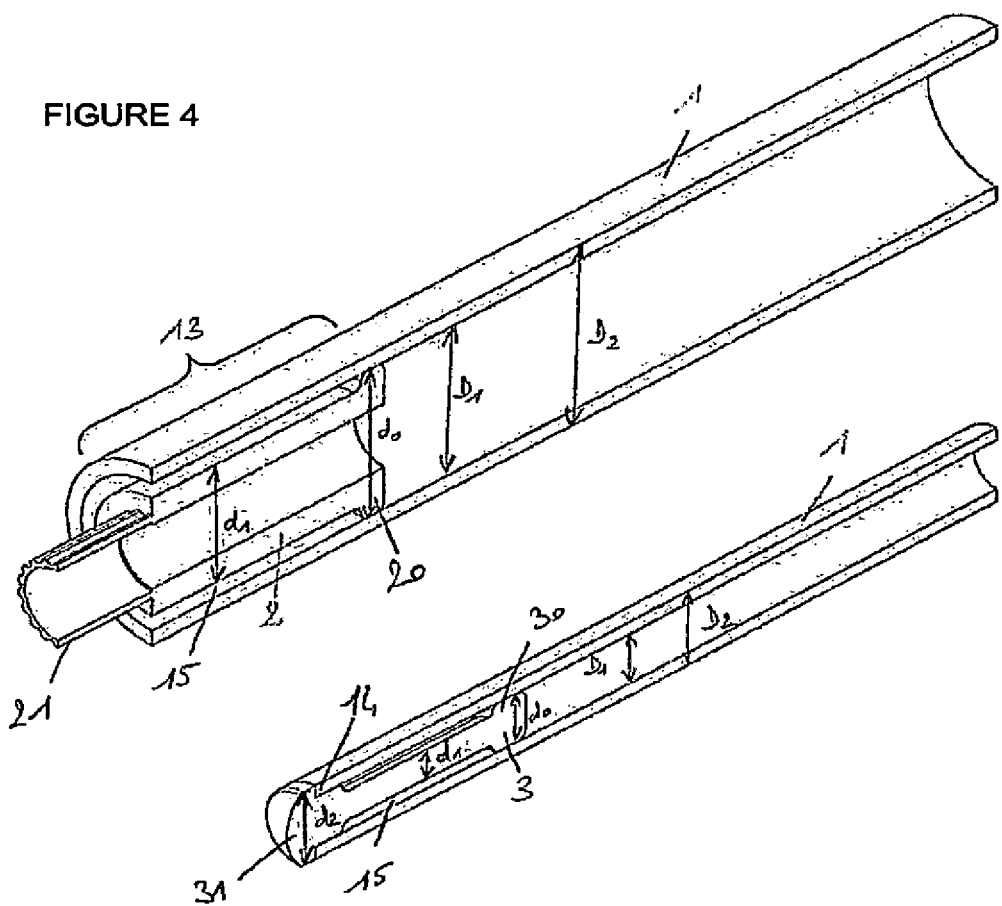
FIG. 4 is a cross section of an embodiment of the assembly before injection according to some embodiments.
FIG. 5 is a cross section of another embodiment of the assembly before injection according to some embodiments.

FIG. 4 shows a cross section of a profile member made of thermosetting composite material with a first type of plug 2 made of thermoplastic material or metal material or a combination of the two materials, inserted into the profile member 1 under the injection zone 13 corresponding to the part of the profile member 1 including the machined end or with furrows or asperities. The plug 2 includes an end 20 whose diameter $d_0$ is substantially equal to the internal diameter D1 of the profile member 1 in order to ensure the seal-tightness of the profile member 1 to the thermoplastic material which will be injected by plugging the opening. Here, the plug 2 will be held by the injection tool in the profile member 1, for example by an internal threading (not represented). There remains a space 15 between the profile member 1 and the plug 2.

In FIG. 5, this is a cross section of a tube made of thermosetting composite material with a second type of plug 3 made of thermoplastic material or of metal material or a combination of the two materials, with an end 30 of diameter $d_0$ substantially equal to the internal diameter $D_1$ of the profile member 1 and a peripheral edge 31 of diameter $d_2$ greater than the external diameter $D_2$ of the profile member 1 and bearing on its end 14. It is the peripheral edge 31 which holds the plug 3 at the end of the profile member 1. There remains a space 15 between the profile member 1 and the plug 3.

Figure 6:
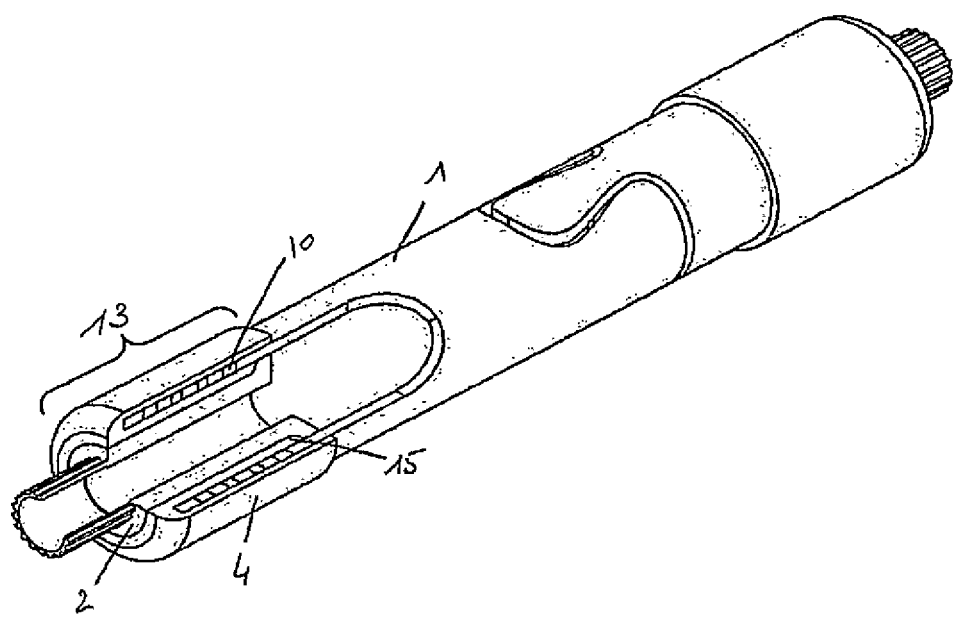
FIG. 6 is a partial cross-sectional view of the assembly of FIG. 4 after injection.

FIG. 6 shows the partial cross section of the profile member 1 of FIG. 1 with a plug 2 of the first type after injection of the thermoplastic material forming the end-fitting 4. The thermoplastic material is entered into the holes 10 to fill the space 15 which allows a better adhesion of the end-fitting 4 on the profile member 1.

Figure 7:
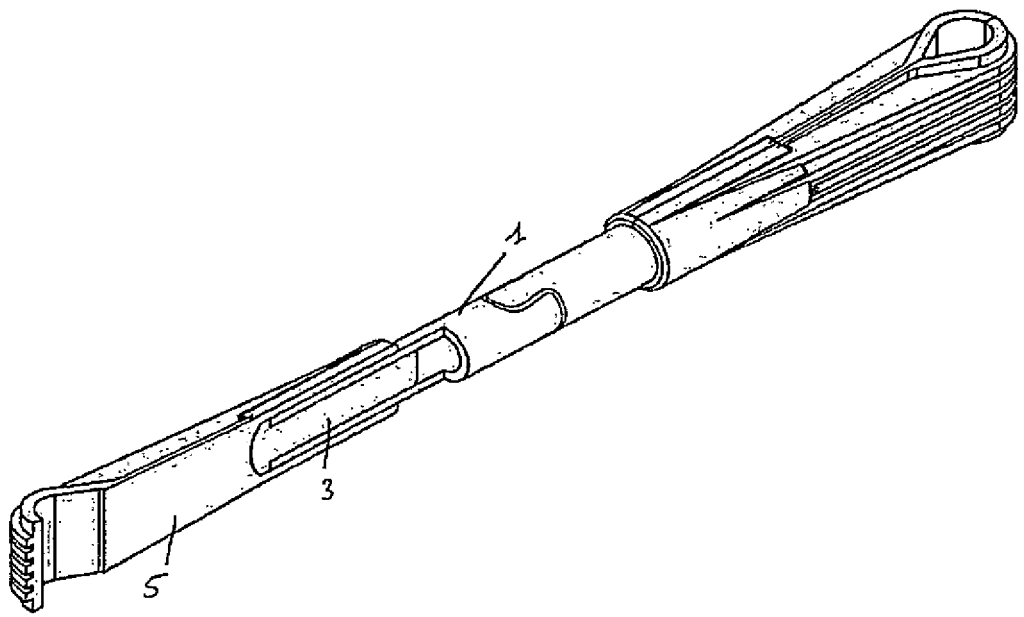
FIG. 7 is a cross-sectional view of an assembly after injection.

FIG. 7 is a cross section of a profile member of FIG. 1 with a plug 3 of the second type after the injection of the end-fitting 5. The thermoplastic material forming the end-fitting 5 has been molded around the profile member 1 in the machined part.

The implementation of the method according to some embodiments takes place as follows: starting from a profile member 1, machining is performed such as that of FIGS. 1 to 3, then a plug 2 is inserted into the injection tool, for example by screwing onto an element of the tool, then the profile member is inserted into the injection tool as in FIG. 4, or, the plug 3 is placed in the profile member 1 as in FIG. 5 to then place it in the injection tool, the assembly of the profile member 1 and of the plug 2 or 3 is then thermally conditioned in the injection tool, then the thermoplastic material is injected into a mold in the shape of the end-fitting 4 or 5. Depending on the form of the machining of the profile member, the thermoplastic material will enter into the holes 10, or the furrows 11, or between the asperities 12.

Obviously, an end-fitting will be produced at each end of the profile member 1 to produce a connecting rod.

The invention claimed is:

1. A method for overmolding a thermoplastic end-fitting on a hollow profile member made of thermosetting composite to produce a connecting rod, the method including:
   machining a shape of the profile member made of thermosetting composite on an injection zone, and the profile member having an internal profile;
   positioning a plug in the profile member at an end, of the profile member, in order to prevent the profile member from being filled with the thermoplastic, the end of the profile member constituting an overmolded end,
      the plug including an external profile, and at least a part of the external profile complementing the internal profile of the profile member and of substantially identical size to the internal profile of the profile member, so as to plug the profile member,
      the profile member and the plug constituting an assembly;
   thermally conditioning the assembly; and
   injecting thermoplastic composite so as to form the end-fitting, and to create a junction of the profile member, the plug, and the end-fitting, to produce the connecting rod.

2. The method as claimed in claim 1, including a step of chemical treatment of the profile member in the injection zone.

3. The method as claimed in claim 2, wherein the positioning of the plug is done by positioning the plug in an injection tool, then by installing the profile member in the injection tool.

4. The method as claimed in claim 1, further including a step of laser treatment of the profile member in the injection zone.

5. The method as claimed in claim 4, wherein the positioning of the plug is done directly on the profile member.

6. The method as claimed in claim 4, wherein the positioning of the plug is done by positioning the plug in an injection tool, then by installing the profile member in the injection tool.

7. The method as claimed in claim 1, wherein the positioning of the plug is done directly on the profile member.

8. The method as claimed in claim 1, wherein the positioning of the plug is done by positioning the plug in an injection tool, and then by installing the profile member in the injection tool.

9. The method as claimed in claim 2, further including a step of laser treatment of the profile member in the injection zone.

10. The method as claimed in claim 2, wherein the positioning of the plug is done directly on the profile member.

11. A connecting rod comprising:
   a hollow profile member made of thermosetting composite of internal diameter $D_1$ and of external diameter $D_2$, and the profile member including an internal profile that includes the internal diameter $D_1$, and the profile member includes a machined part at an end of the profile member;
   a thermoplastic end-fitting; and
   a plug arranged inside the profile member, the plug including an external profile, and
   wherein the plug is arranged on the end of the profile member in order to prevent the profile member from being filled with the thermoplastic, and the end of the profile member constituting an overmolded end,
   the plug having at least a part of the external profile, of the plug, (a) complementing the internal profile, of the profile member, and (b) of substantially identical size as the internal profile, of the profile member, so that the plug plugs the profile member,
   the machined part including machined shapes, and
   wherein the machined part provides mechanical linking of the profile member to the end-fitting, with the machined shapes on the profile member provided to hold the end-fitting on the profile member by the mechanical linking.

12. The connecting rod as claimed in claim 11, wherein the machined part of the profile member is pierced.

13. The connecting rod as claimed in claim 12, wherein the plug has an external diameter $D_1$ smaller than the internal diameter $D_1$ of the profile member, and the external diameter $D_1$ extending over a portion of a length of the plug.

14. The connecting rod as claimed in claim 13, wherein the plug has a peripheral edge of diameter $d_2$ greater than the external diameter $d_2$ of the profile member.

15. The connecting rod as claimed in claim 12, wherein the plug has a peripheral edge of diameter d2 greater than the external diameter $d_2$ of the profile member.

16. The connecting rod as claimed in claim 11, wherein the machined part of the profile member has received a laser treatment.

17. The connecting rod as claimed in claim 16, wherein the plug has a peripheral edge of diameter $d_2$ greater than the external diameter $d_2$ of the profile member.

18. The connecting rod as claimed in claim 11, wherein the plug has a peripheral edge of diameter d2 greater than the external diameter $d_2$ of the profile member.

19. The connecting rod as claimed in claim 11, the machined shapes include a plurality of holes in the profile member, and the end-fitting entered into the holes.

20. The connecting rod as claimed in claim 19, wherein:
   the at least a part, of the external profile of the plug, is an end of the plug having an external diameter $d_o$; and
   a further part of the external profile, of the plug, extending from the end of the plug toward the end of the profile member, and the further part having an external diameter $d_1$ that is less than the external diameter $d_o$, such that a space is provided (a) along the further part, and (b) between the profile member and the plug,
   the end-fitting entered into the holes so as to fill the space and provide the mechanical linking; and
   the end-fitting entered into an open end, at the end of the profile member, such that the end-fitting further fills the space.

* * * * *